United States Patent [19]

Stewart, Jr.

[11] 4,123,603
[45] Oct. 31, 1978

[54] FLUOROELASTOMER COMPOSITION

[75] Inventor: Clare A. Stewart, Jr., Wilmington, Del.

[73] Assignee: E. I. Du Pont de Nemours and Company, Wilmington, Del.

[21] Appl. No.: 801,567

[22] Filed: May 31, 1977

[51] Int. Cl.$^2$ ............................................. C08F 214/22
[52] U.S. Cl. .................................................... 526/254
[58] Field of Search ........................................ 526/254

[56] References Cited

U.S. PATENT DOCUMENTS

| | | | |
|---|---|---|---|
| 2,968,649 | 1/1961 | Pailthorp et al. | 526/254 |
| 3,707,529 | 12/1972 | Gladding et al. | 526/254 |
| 4,027,086 | 5/1977 | Valvo et al. | 526/254 |

*Primary Examiner*—Harry Wong, Jr.

[57] ABSTRACT

An elastomeric fluoropolymer having improved low temperature properties is provided. The composition contains polymerized units of 57–61 weight % vinylidene fluoride, 27–31 weight % hexafluoropropene, and 10–14 weight % tetrafluoroethylene.

2 Claims, 1 Drawing Figure

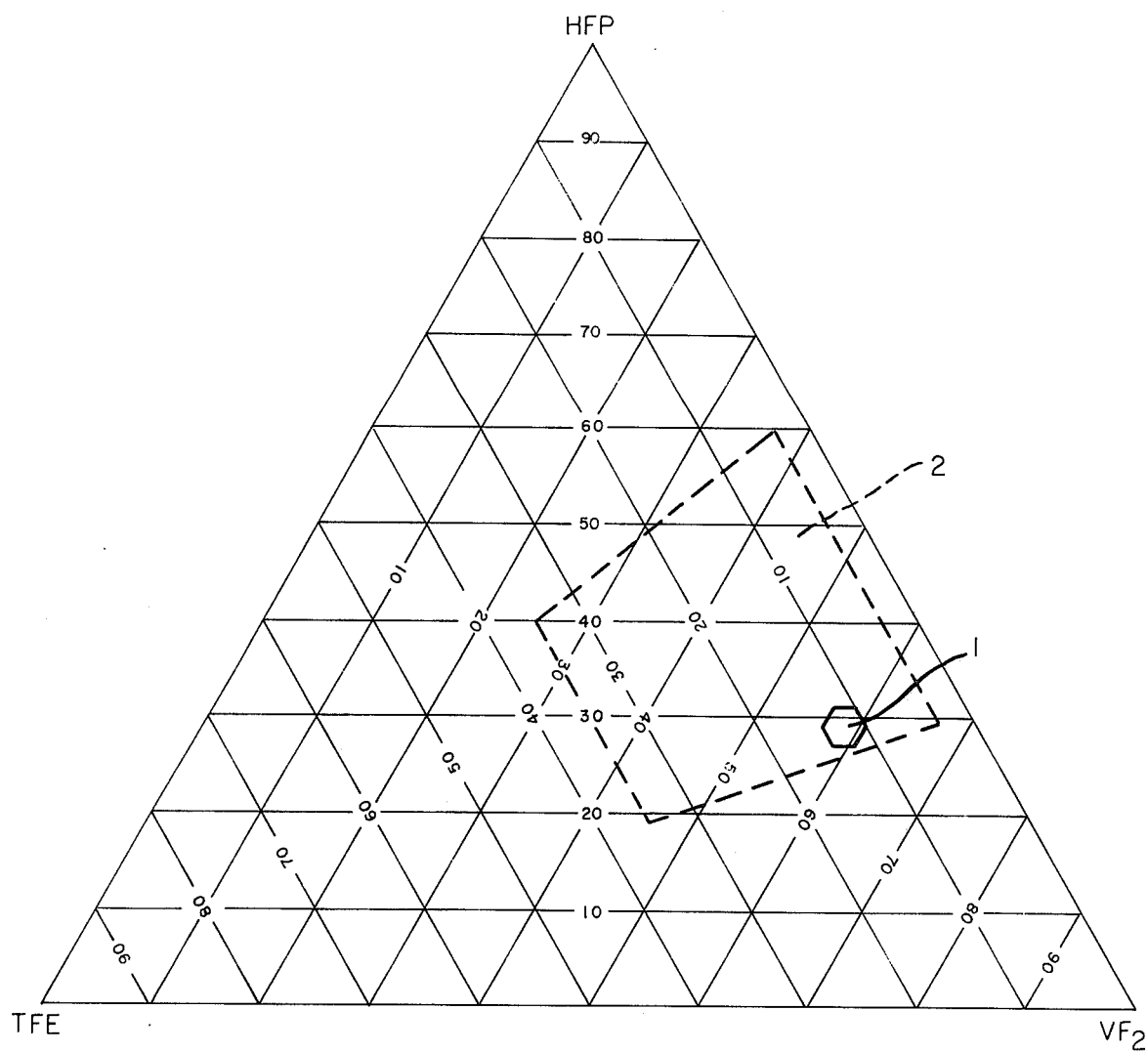

FLUOROELASTOMER COMPOSITION

BACKGROUND OF THE INVENTION

This invention is an improved terpolymer obtained by copolymerizing vinylidene fluoride, hexafluoropropene and tetrafluoroethylene. The resulting fluoroelastomer possesses both improved low temperature compression set and a low glass transition temperature.

Fluoroelastomeric terpolymers are known in the art. U.S. Pat. No. 2,968,649 discloses and claims a terpolymer consisting of 3 to 35% by weight of tetrafluoroethylene units and 97 to 65% by weight of vinylidene fluoride and hexafluoropropene units, in which the vinylidene fluoride and hexafluoropropene units are in a weight ratio in the range of 2.33:1 to 0.667:1.0

U.S. Pat. No. 3,801,552 discloses a method of producing a fluoroelastomeric terpolymer by polymerization of tetrafluoroethylene, vinylidene fluoride and hexafluoropropene. The composition of the terpolymer falls within the area bounded by the following four mole ratios of tetrafluoroethylene, vinylidene fluoride, and hexafluorpropene: 5:85.7:9.3, 5:59.7:35.3, 30:28:42, and 30:54:16.

Japanese Patent Publication 48-18957/73 discloses a process for preparing fluorine-containing terpolymers containing 10–30% by weight of tetrafluoroethylene and 90–70% by weight of vinylidene fluoride and hexafluoropropene having weight ratio of vinylidene fluoride to hexafluoropropene in the range 1.6:1 to 4:1.

In addition, a fluorine-containing terpolymer has been marketed in the U.S. by Daikin Kogyo Co., Ltd., Osaka, Japan, in which the composition by weight of tetrafluoroethylene, vinylidene fluoride and hexafluoropropene was about 14:53:33.

Unless otherwise indicated, all percentages used herein denote weight percent, and vinylidene fluoride, tetrafluoroethylene, and hexafluoropropene will be referred to as $VF_2$, TFE and HFP, respectively.

SUMMARY OF THE INVENTION

This invention is an elastomeric terpolymer containing polymerized units of the following monomers in the ranges indicated:

(a) 57–61% vinylidene fluoride;
(b) 27–31% hexafluoropropene; and
(c) 10–14% tetrafluoroethylene.

Especially preferred in a composition containing 59% $VF_2$, 29% HFP, and 12% TFE.

BRIEF DESCRIPTION OF THE DRAWING

FIG. 1 shows in triangular coordinates the ranges of the amounts of the polymerized units of the composition of this invention.

The area 1 of FIG. 1 shows the bounds of the compositions which contain 57–61% $VF_2$, 27–31% HFP, and 10–14% TFE.

The larger area 2 of FIG. 1 shows the bounds of the compositions which would contain 3–35% TFE and 97–65% $VF_2$ and HFP in which the $VF_2$ and HFP units are in a weight ratio in the range 2.33:1 to 0.667:1 as claimed in U.S. Pat. No. 2,968,649, discussed hereinabove.

DETAILED DESCRIPTION OF THE INVENTION

A fluorine-containing terpolymer having a composition in the range of 57–61% vinylidene fluoride, 27–31% hexafluoropropene and 10–14% tetrafluoroethylene, all polymerized units, possesses advantageous and unexpected properties compared to terpolymers of the prior art.

Within this composition range, low glass transition temperature, i.e., −24° C. or below, together with a high compression set recovery is achieved. The term "high compression set recovery" as used herein means either: (1) less than 20% residual compression set measured within one hour after warming the sample to room temperature following compression set determination at 0° C. for 70 hours according to ASTM Method D-395, or (2) less than 10% residual compression set measured after allowing the sample to recover at room temperature overnight for at least 16 hours following the compression set determination according to the above ASTM method B.

The terpolymers of this invention are made by copolymerizing the $VF_2$, TFE and HFP monomers using known polymerization methods as described in U.S. Pat. No. 2,968,649. More specifically, the preferred polymer of this invention may be prepared by feeding a mixture of compressed gases containing 12% TFE, 59% $VF_2$ and 29% HFP to a mechanically stirred autoclave maintained at an elevated temperature (e.g., 40° C. to 140° C.) and pressure (e.g., 1.4 to 14 MPa), and simultaneously feeding water, ammonium persulfate, sodium hydroxide, and diethyl malonate or other chain-transfer agents as discussed in the examples hereinbelow.

The composition is useful as a general purpose low temperature and fluid resistant elastomer. Applications include O-rings, shaft seals, solution coatings, roll covers, tubing and hose linings, where low temperature flexibility is required. This composition is especially useful in automotive applications such as carburetor fuel pump diaphragms and shaft seals.

EXAMPLE 1

A two-liter, mechanically stirred autoclave was controlled at a temperature of 105° C. and a pressure of 900 psig (6.3 MPa), and the following ingredients were fed to the autoclave:

(a) four liters per hour of water containing 2.17 g/l ammonium persulfate and 0.43 g/l sodium hydroxide;

(b) four liters per hour of water containing 0.7 g/l diethyl malonate; and (c) 2210 g/hr. of a mixture of compressed gases containing 12% TFE, 59% $VF_2$ and 29% HFP.

After several turnovers of reactor contents, the liquid effluent from the reactor was collected and treated with a solution of potassium aluminum sulfate. A rubbery crumb separated.

The crumb was washed with water and dried in a circulating air oven. From the measured amounts of feed and unreacted monomers (61 g/hr.) separated from the effluent and the composition of the effluent stream as determined by gas chromatography (1% TFE, 34% $VF_2$, 65% HFP, molar basis) the composition of the polymer was 12% TFE, 60% $VF_2$ and 28% HFP on a weight basis. This polymer had a Mooney viscosity of 93 (ML-10, 100° C.).

EXAMPLES 2–17

The polymer compositions listed in Table I below were prepared in the same manner as described in Example 1 by adjustment of the composition of the monomer mixture being fed to the reactor, except that for Examples 5 through 7, a temperature of 120° C. was maintained and the nominal residence time was varied from 9 to 30 minutes (13.3 to 4.0 l/hr total water), with compensating changes in catalyst to obtain comparable molecular weights.

The compositions of Examples 1–7 fall within the scope of the claims below. Examples 8–17 are supplied for comparison purposes. The compositions of comparative examples 8–17 are outside the scope of this invention.

TABLE I

| Example | % TFE | % VF$_2$ | % HFP |
|---|---|---|---|
| 2 | 14 | 58 | 28 |
| 3 | 12 | 58 | 30 |
| 4 | 12 | 59 | 29 |
| 5 | 12 | 59 | 29 |
| 6 | 12 | 59 | 29 |
| 7 | 12 | 59 | 29 |
| Comparative Example | | | |
| 8 | 0 | 59 | 41 |
| 9 | 0 | 68 | 32 |
| 10 | 0 | 70 | 30 |
| 11 | 10 | 62 | 28 |
| 12 | 12 | 62 | 26 |
| 13 | 16 | 59 | 25 |
| 14 | 20 | 57 | 23 |
| 15 | 17 | 55 | 28 |
| 16 | 12 | 56 | 32 |
| 17 | 8 | 59 | 33 |

Table II shows the glass transition temperatures (Tg) of the raw polymers of Examples 1–17 as measured by Differential Scanning Calorimetry. Also shown are the temperatures at which vulcanizate samples reach a torsional modulus of 10,000 psi (69 MPa) as measured by the Clash-Berg test (ASTM Method D-1043). For the latter test, 100 parts of the polymer samples were compounded on a rubber mill with 30 parts medium thermal carbon black, 3 parts active magnesia ("Maglite" D, trademark of Merck and Co.), 6 parts calcium hydroxide, 0.6 parts benzyl triphenyl phosphonium chloride, and 1.35 parts 2,2-bis(p-hydroxyphenyl)-hexafluoropropane. These compounds were compression molded for 10 minutes at 177° C. and post cured in a circulating air oven for 24 hours at 232° C.

The glass transition temperatures and Clash-Berg temperatures are measurements of the degree to which the polymer may be cooled without losing an acceptable degree of flexibility.

Also shown in Table II is the compression set measured on similarly vulcanized specimens, according to ASTM Method D-395B (70 hours at 0° C., final thickness measured at 0° C.). The specimens were then allowed to recover from set to room temperature, and the following classification rating was given to each sample: (1) "good" if the recovery from compression was such that the residual set was less than 20% as measured shortly (within 1 hour) after warming to room temperature or the residual set was less than 10% after standing overnight (for at least 16 hours) at room temperature, and (2) "poor" if the residual set was greater than these values.

Polymers from Comparative Examples 9 and 10 exhibited extensive crystallization in differential scanning calorimetry tests, and samples from Comparative Example 14 exhibited moderate crystallization. These samples were therefore rejected for low temperature use without further testing.

As shown in Table II, the polymers of this invention have lower glass transition temperatures than the polymers of Comparative Examples 8 and 14–17. Thus, the polymers of this invention possess superior low temperature flexibility over the polymers of Comparative Examples 8 and 14–17.

Polymers from Examples 9–14 are undesirable for low temperature use because of their crystallinity either at room temperature or as induced by stress under the conditions of the compression set test.

Only within the range of compositions claimed below is an acceptable combination of low temperature flexibility and recovery from low temperature compression set obtained.

TABLE II

| Polymer Sample | Tg (° C) | Clash-Berg $T_{10,000}$, ° C | ASTM-D395 Compression Set, %* (70 hr/0° C) | Compression Set Recovery at Room Temperature |
|---|---|---|---|---|
| Example 1 | −27 | −20 | 79 | good |
| " 2 | −26 | — | — | — |
| " 3 | −24 | — | — | — |
| " 4 | −25 | −19 | — | — |
| " 5 | −24 | −16 | 48 | good |
| " 6 | −26 | −18 | 66 | good |
| " 7 | −24 | −18 | 66 | good |
| Comparative Example 8 | −22 | −14 | 26 | good |
| " 9 | −26 | — | — | — |
| " 10 | −30 | — | — | — |
| " 11 | −25 | −22 | 90 | poor |
| " 12 | −26 | −22 | 95 | poor |
| " 13 | −26 | −19 | 74 | poor |
| " 14 | −23 | — | — | — |
| " 15 | −22 | −16 | 36 | good |
| " 16 | −23 | −16 | 39 | good |
| " 17 | −23 | −16 | 35 | good |

*Final thickness measured at 0° C.

I claim:

1. An improved elastomeric terpolymer containing polymerized units of vinylidene fluoride, hexafluoropropene and tetrafluoroethylene wherein the improvement is characterized in that said vinylidene fluoride is present in the amount of 57–61 weight percent, said hexafluoropropene is present in the amount of 27–31 weight percent, said tetrafluoroethylene is present in the amount of 10–14 weight percent, and said terpolymer has a glass transition temperature of −24° C. or below and, when vulcanized, high compression set recovery as measured by a test from the group consisting of (1) less than 20% residual compression set measured within one hour after warming the sample to room temperature following compression set determination at 0° C. for 70 hours according to ASTM D-395, Method B, and (2) less than 10% residual compression set measured after allowing the sample to recover at room temperature overnight for at least 16 hours following the compression set determination according to said ASTM method.

2. The composition of claim 1 containing 59% vinylidene fluoride, 29% hexafluoropropene and 12% tetrafluoroethylene.

* * * * *